US008688034B2

(12) United States Patent
Kalhan

(10) Patent No.: US 8,688,034 B2
(45) Date of Patent: Apr. 1, 2014

(54) REPEATER WITH MOBILE COMMUNICATION DEVICE FEEDBACK

(75) Inventor: Amit Kalhan, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 280 days.

(21) Appl. No.: 13/227,699

(22) Filed: Sep. 8, 2011

(65) Prior Publication Data

US 2013/0065515 A1    Mar. 14, 2013

(51) Int. Cl.
*H04B 15/00*    (2006.01)
*H04B 7/14*    (2006.01)

(52) U.S. Cl.
USPC .......... 455/24; 455/69; 455/67.13; 455/452.2

(58) Field of Classification Search
USPC ......... 455/7, 24, 63.1, 67.13, 562.1, 11.1, 15, 455/20, 69, 9, 517, 452.2, 67.11
See application file for complete search history.

(56) References Cited

U.S. PATENT DOCUMENTS

| | | | |
|---|---|---|---|
| 8,135,339 B2* | 3/2012 | Ranson et al. | 455/24 |
| 8,320,825 B2* | 11/2012 | Goransson et al. | 455/7 |
| 2010/0062708 A1* | 3/2010 | Sangiamwong et al. | 455/24 |
| 2010/0157876 A1 | 6/2010 | Song | |

FOREIGN PATENT DOCUMENTS

| | | |
|---|---|---|
| EP | 2 161 853 A2 | 3/2010 |
| WO | 2007053068 A1 | 5/2007 |

* cited by examiner

*Primary Examiner* — John J Lee

(57) ABSTRACT

The apparatus comprises a plurality of antennas that are configured to receive wireless signals comprising communication signals and interference signals. Each antenna provides an antenna output signal that is processed by a wireless signal processor of the apparatus to generate a processed wireless signal. A user equipment (UE) communication interface is configured to transmit the processed wireless signal to the mobile wireless communication device. A signal quality feedback interface receives, from the mobile wireless communication device, a wireless feedback signal indicating the characteristic of the processed wireless signal received at the mobile wireless communication device. The wireless signal processor combines the antenna output signals based on the wireless feedback signal to minimize interference signals received at the mobile wireless communication device.

29 Claims, 4 Drawing Sheets

REPEATER WITH MOBILE COMMUNICATION DEVICE FEEDBACK

FIELD

This invention generally relates to wireless communications and more particularly to signal repeaters based on user equipment feedback signals.

BACKGROUND

Relays and repeaters receive, amplify, and retransmit signal in order to increase signal strength in areas where the originally transmitted signals are weak. Typically, repeaters are relays that do not perform baseband processing. Relays and repeaters are used to provide coverage in areas where received signal power is very low such as within buildings, within valleys, or in areas were signals are obstructed by natural or manmade structures. Unfortunately, conventional relays are often ineffective when interference is present.

SUMMARY

In accordance with the embodiments discussed below, an apparatus processes signals received through a plurality of antennas from a base station in accordance with signal quality information provided by a mobile wireless communication device before retransmitting the signals to the mobile wireless communication device. The apparatus comprises a plurality of antennas that are configured to receive wireless signals comprising communication signals and interference signals. Each antenna provides an antenna output signal that is processed by a wireless signal processor of the apparatus to generate a processed wireless signal. A user equipment (UE) communication interface is configured to transmit, within a frequency band other than a communication frequency band used by the base station, the processed wireless signal to the mobile wireless communication device. A signal quality feedback interface receives, from the mobile wireless communication device, a wireless feedback signal indicating the characteristic of the processed wireless signal received at the mobile wireless communication device. The wireless signal processor combines the antenna output signals based on the wireless feedback signal to minimize interference signals received at the mobile wireless communication device.

DETAILED DESCRIPTION

Figure 1:
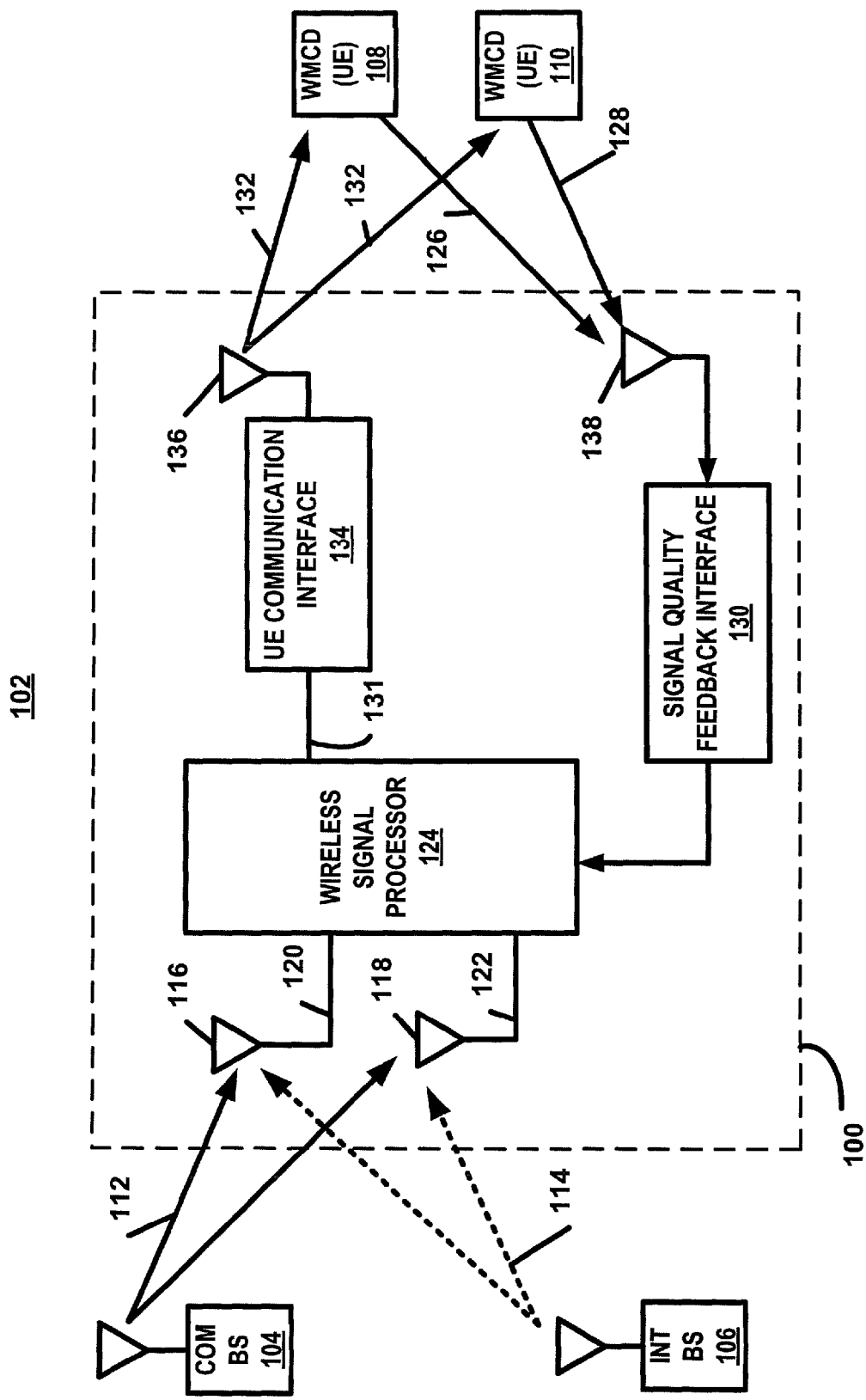
FIG. 1 is a block diagram of a repeater apparatus operating within a communication system.

FIG. 1 is a block diagram of a repeater apparatus 100 operating within a communication system 102. The communication system 102 includes at least one base station 104 and typically includes several base stations 104, 106, each providing wireless service within a geographical service area to mobile wireless communication devices 108, 110. In the exemplary embodiment, the system 102 operates in accordance with orthogonal frequency division modulation (OFDM) techniques. The system 102, however, may operate in accordance with other radio technologies and protocols such as CDMA, for example.

The mobile wireless communication device 108, 110 is any user device such as cellular telephone, smart phone, or personal digital assistant, for example. Such devices may be referred to as user equipment (UE) devices, handsets, mobile devices, or cell phones, among other terms. As discussed below in further detail, each wireless communication device 108, 110 includes a wireless communication transceiver for exchanging wireless signals with one or more base stations and a signal feedback transmitter for transmitting a signal quality feedback signal to the repeater apparatus 100.

The repeater apparatus 100 is deployed in a location to foster improved wireless communication coverage by the system 102. Signals 112, 114 from one or more base stations 104, 106 are received through multiple antennas 116, 118, combined, amplified, and transmitted. For discussion of the example of FIG. 1, the base stations 104, 106 are referred to as a communication base station 104 and an interference base station 106. Signals 112 transmitted by the communication base station 104 are desired signals and signals 114 transmitted by the interference base station 106 are undesired interference signals 114. The communication base station 104 is a base station that is communicating with at least one mobile wireless communication device 108 receiving signals from the repeater apparatus 100. Although other numbers of base stations may be present in other situations, the discussion is directed to two base stations in the interest of clarity and brevity. It is likely, for example, that interface signals 114 may be received from two or more interference base stations that are within the vicinity of the repeater apparatus 100.

Signals 112, 114 are received through a plurality of antennas 116, 118 where the antennas 116, 118 may be individual antennas or may be different antenna elements of a single antenna. Each antenna produces an antenna output 120, 122 based on the signals that it receives. A wireless signal processor 124 combines the antenna outputs 120, 122 based on signal quality feedback signals 126, 128 received from at least one mobile wireless communication device 108, 110 through a signal quality feedback interface 130. Although other processing may be used in some circumstances, the antenna output signals 120, 122 are weighted and added. Any of several known antenna weighting techniques can be used. An example of one suitable technique includes phase-array combining where phase adjustments are made to the antenna output signals 120, 122 such that interference is reduced when the signals are combined. The phase adjustments result in destructive combining of the interference and/or constructive combining of the desired signals.

The resulting processed wireless signal 131 is amplified and transmitted as downlink signals 132 by a user equipment communication interface 134 through one or more antennas 136. The downlink signals 132 are received and evaluated by the wireless communication devices 108, 110 to determine a quality of the signals 132. Each wireless communication device 108, 110 transmits a signal quality feedback signal 126, 128 indicating the quality of the downlink signal 132. The signal quality feedback signal 126, 128 may include a signal quality indicator such as a signal to noise ratio (SNR), signal to interference-plus-noise ratio (SINR), signal-to-interference ratio (S/I or SIR), bit error rate (BER) or other quality metric that provides information regarding quality of the downlink signal. The signal quality indicator may be a combination of ratios, metrics, or other characteristics. For the examples discussed herein the quality indicator is SINR. In conventional systems, the mobile wireless communication device determines quality metrics of signals and reports the measurements or related indicators to the base station by transmitting uplink signals. For example, a channel estimation procedure is performed by mobile wireless communication devices and the results are reported to one or more base stations. Accordingly, an example of suitable technique for determining the signal quality parameters for transmission to the repeater apparatus 100 includes using the same parameters used in conventional systems for transmission to base stations.

The signal quality feedback signals 126, 128 are transmitted using a communication technology different than the communication technology used for communication between the base stations 104, 106 and the wireless communication devices 108, 110. Accordingly, the transmission of the communication signals 112 and the processed downlink signals 132 complies with a first wireless communication standard and the transmission of the signal quality feedback signals 126, 128 complies with a second wireless communication standard. For example, the communication system 102 may use a CDMA wireless standard for communication between the base stations 104, 106 and the mobile wireless communication devices whereas the mobile wireless communication devices 108, 110 may transmit the signal quality feedback signals 126, 128 using an IEEE 802.11 wireless communication standard.

For the examples herein, the signal quality feedback signals 126, 128 are transmitted within a frequency band different than the frequency band used for transmitting the communication signals 112, 114 and downlink signals 132. An example of a suitable technique includes transmitting the signal quality feedback signals 126, 128 over a communication link operating in accordance with an IEEE 802.11 standard (WiFi). Examples of other suitable technologies of the communication link for conveying the signal quality feedback signals include wireless local area network (WLAN), and personal area network (PAN) technologies such as Bluetooth and Zigbee.

The signal quality feedback interface 130 receives the signal quality feedback signal 126 from at least one mobile wireless communication device 108 through one or more antennas 138. The wireless signal processor 124 applies the quality information provided by the signal quality feedback signal 126 to process the antenna outputs 120, 122. For the example discussed herein, the wireless signal processor 124 weights the antenna outputs 120, 122 at least partially based on the quality information. An example of a suitable technique for adjusting the weighting includes evaluating a history of the quality information relative to the weightings and adjusting the weightings to increase the quality. Accordingly, a trial and error technique may be applied to minimize interference.

Figure 2:
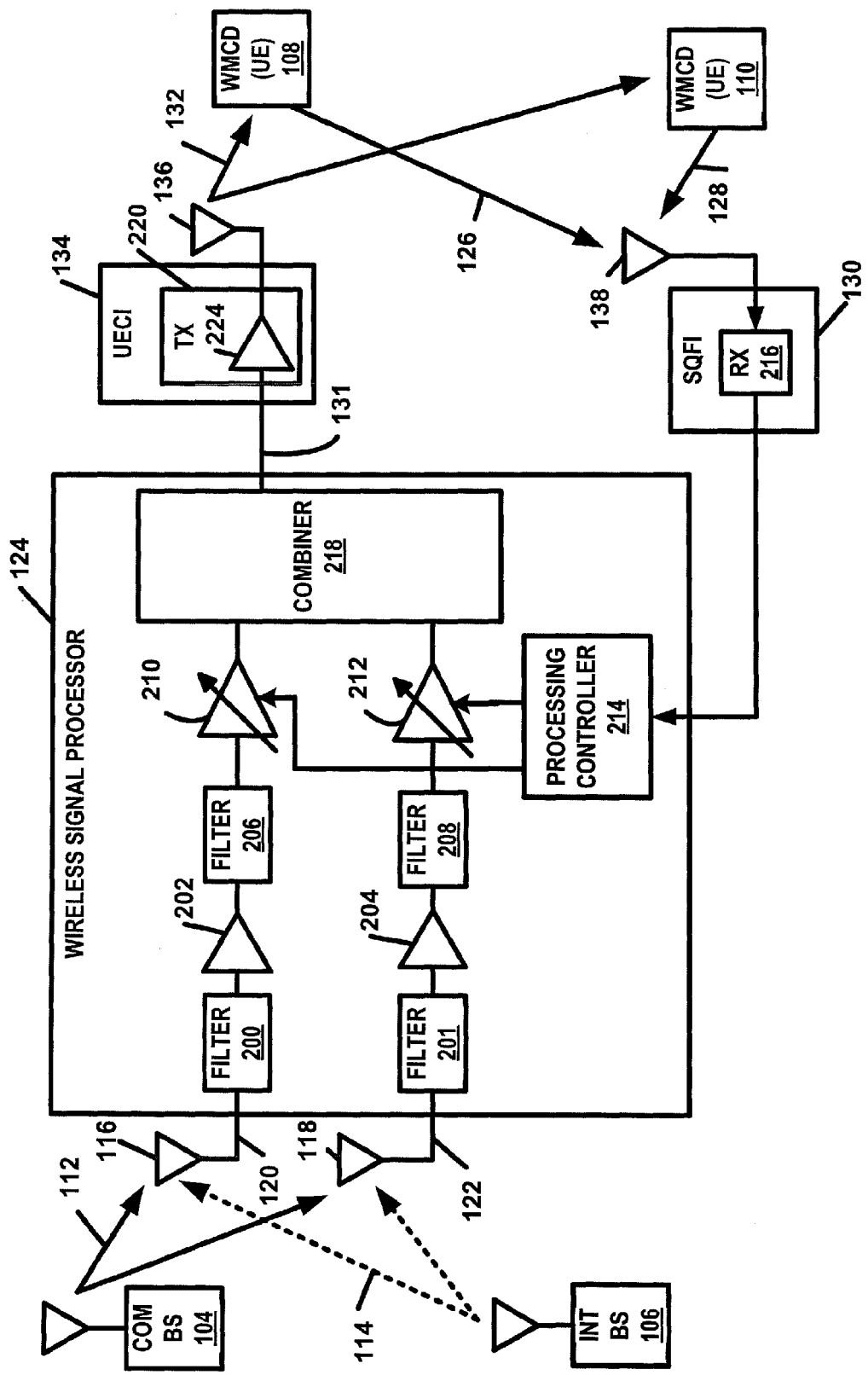
FIG. 2 is a block diagram of the repeater apparatus operating within a communication system for an example where the wireless signal processor weights and combines the antenna outputs.

FIG. 2 is a block diagram of the repeater apparatus 100 operating within a communication system 102 for an example where the wireless signal processor 124 weights and combines the antenna outputs 120, 122.

For this example, the wireless signal processor 124 includes electronics that weight and combine signals where the electronics may perform amplification, filtration, attenuation, and combination of signals based on the signal quality feedback parameters. Other electronics and functional blocks may be used in some circumstances. Each antenna output is filtered by a receiver filter 200, 201 and amplified by a low noise amplifier (LNA) 202, 204 before being filtered by a second RF filter 206, 208. The receiver filters 200, 201 before the LNAs 202, 204 are used for tuning to the carrier-frequency band and the RF filters 206, 208 after the LNAs 202, 204 are typically used for further processing where needed.

The amplitudes and phases of the filtered signals are adjusted by complex weight adjusters 210, 212. The complex weight adjusters 210, 212 may include attenuators or amplifiers that are controllable by the processing controller 214. Where the complex weight adjusters 210, 212 include amplifiers, the gain of each amplifier is established based on a control signal provided by the processing controller 214. In circumstances where the complex weight adjusters 210, 212 include variable attenuators, the level of attenuation of each attenuator is established based on a control signal provided by the processing controller 214. The complex weight adjusters 210, 212 also include programmable electronic phase shifters for varying the phase of each antenna output. In response to a control signal from the processing controller 214, the electronic phase shifters adjust the phase of the signal relative to the other signals. Such complex weight adjusters are known and are often used for beam forming. Combined amplitude and phase control can often be used to adjust side lobe levels and steer nulls better than can be achieved by phase control alone. Other techniques can be used for adjusting the phase. For example, the phase can be changed by varying a signal path length for each antenna. The processing controller 214 is any processor, controller, or other arrangement of electronics that determines the desired gain of each variable amplifier to increase the quality of the downlink signals received by the mobile wireless communication devices 108, 110. A receiver 216 in the signal quality feedback interface 130 receives the signal quality feedback signals 126, 128 and provides signals or other indicators to the processing controller 214 to convey the signal quality parameters of the downlink signals 132 received at the mobile wireless communication devices 108, 110.

Therefore, the processing controller 214 controls the complex weight adjusters 210, 212 to weight the antenna output signals. The combiner 218 combines the weighted signals to generate a combined signal that is provided to the user equipment communication interface (UECI) 134. The combiner 218 sums the weighted signals in the example. The UECI 134 includes at least a transmitter 220 that transmits the combined signal through the antenna 136 as the downlink signal 132 to the mobile wireless communication devices 108, 110. Although the transmitter 220 may include other devices and electronics such as filters and antenna controllers, the transmitter 220 at least includes an amplifier 224 for amplifying the combined signal before transmission through the antenna 136. In some situations, the antenna 136 may include multiple elements or may include multiple antennas. For example, it may be beneficial to include multiple antennas 136 in circumstances where the base station transmitting the original signals transmitted the original signals through multiple antennas.

Although the processing controller 214 may apply additional algorithms in some situations, the processing controller 214 implements a feedback loop based on the signal quality of the downlink signals received at the mobile wireless communication devices 108, 110. For the example, the repeater apparatus 100 is implemented such that there is sufficient isolation between the wireless signal processor 124 and the UECI 134 so that there is no positive feedback loop. Any of several known techniques may be used to ensure adequate isolation. During operation, therefore, the repeater apparatus 100 weights, adjusts the phase of, combines, and amplifies signals to maximize the quality of the downlink signals received by one or more mobile wireless communication devices 108, 110. The incoming signals received by the plurality of antennas 116, 118 include the desired communication signals 112 as well as undesired interference signals 114. Since the combination of the signals reaching each antenna is typically different, the amplitudes of antenna outputs signals having higher components of communication signals are increased relative to antenna outputs having lower components of communication signals. Amplitudes of antenna output signals with higher levels of interferences signals can be decreased relative to other antenna output signals. Taking the technique to an extreme in an example, if one antenna 116 receives only communication signals 112, and the other antenna 118 receives only interference signals 114, the antenna outputs 120, 122 can be weighted and combined such that only the antenna output 120 is amplified and transmitted to the mobile wireless communication devices 108, 110.

For the example described herein, the repeater apparatus 100 does not perform any analog to digital processing of the antenna output signals. Accordingly, the digital baseband signals are not recovered by the repeater apparatus 100 using an analog to digital converter (ADC), for example. Such processing may add expense, latency, and a loss of information.

The repeater apparatus 100, therefore, transmits downlink signals 132 that represent the communication signals transmitted by the base station 104. By weighting, combining, and amplifying the received signals, a downlink signal 132 can be transmitted that has higher quality than communication signals received by the mobile wireless communication devices 108, 110 from a base station.

Figure 3:
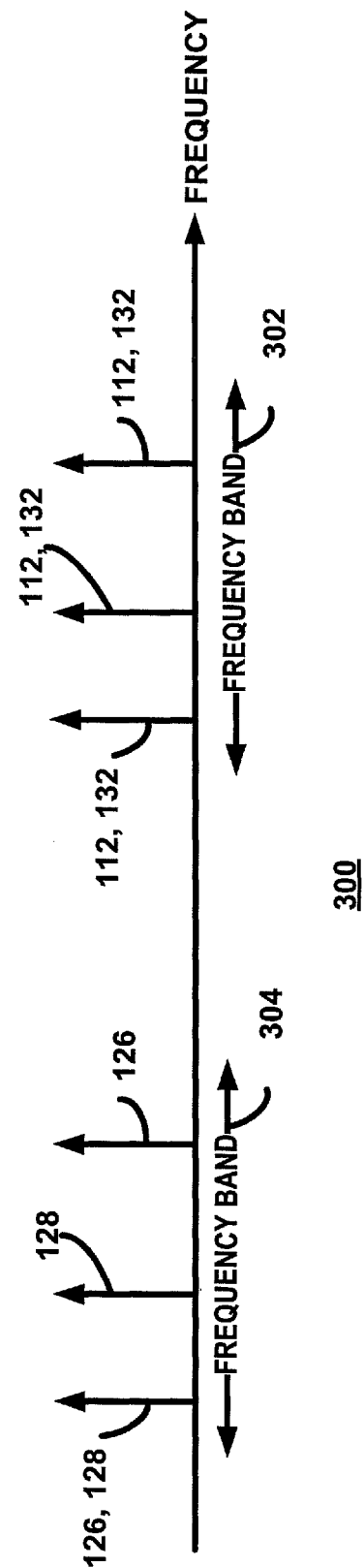
FIG. 3 is a graphical representation of a frequency spectrum showing the signal quality feedback signals outside of the communication frequency band used by the communication system for communication between the base station and the mobile wireless communication devices.

FIG. 3 is a graphical representation of a frequency spectrum 300 showing the signal quality feedback signals 126, 128 outside of the communication frequency band 302 used by the communication system 102 for communication between the base station 104 and the mobile wireless communication devices 108, 110. The signal quality feedback signals 126, 128 are transmitted within a frequency band 304 that is different from the frequency band 302 used for transmission of the communication signals 112 and the processed downlink signals 132. For example, the first frequency band 302 used by the base station may be an OFDM band from 1930 to 1990 MHz for downlink transmissions and 1850 to 1910 MHz for uplink transmissions and the second frequency band 304 may be a IEEE 802.11(n) band from 2.400 GHz to 2.4835 GHz.

Figure 4:
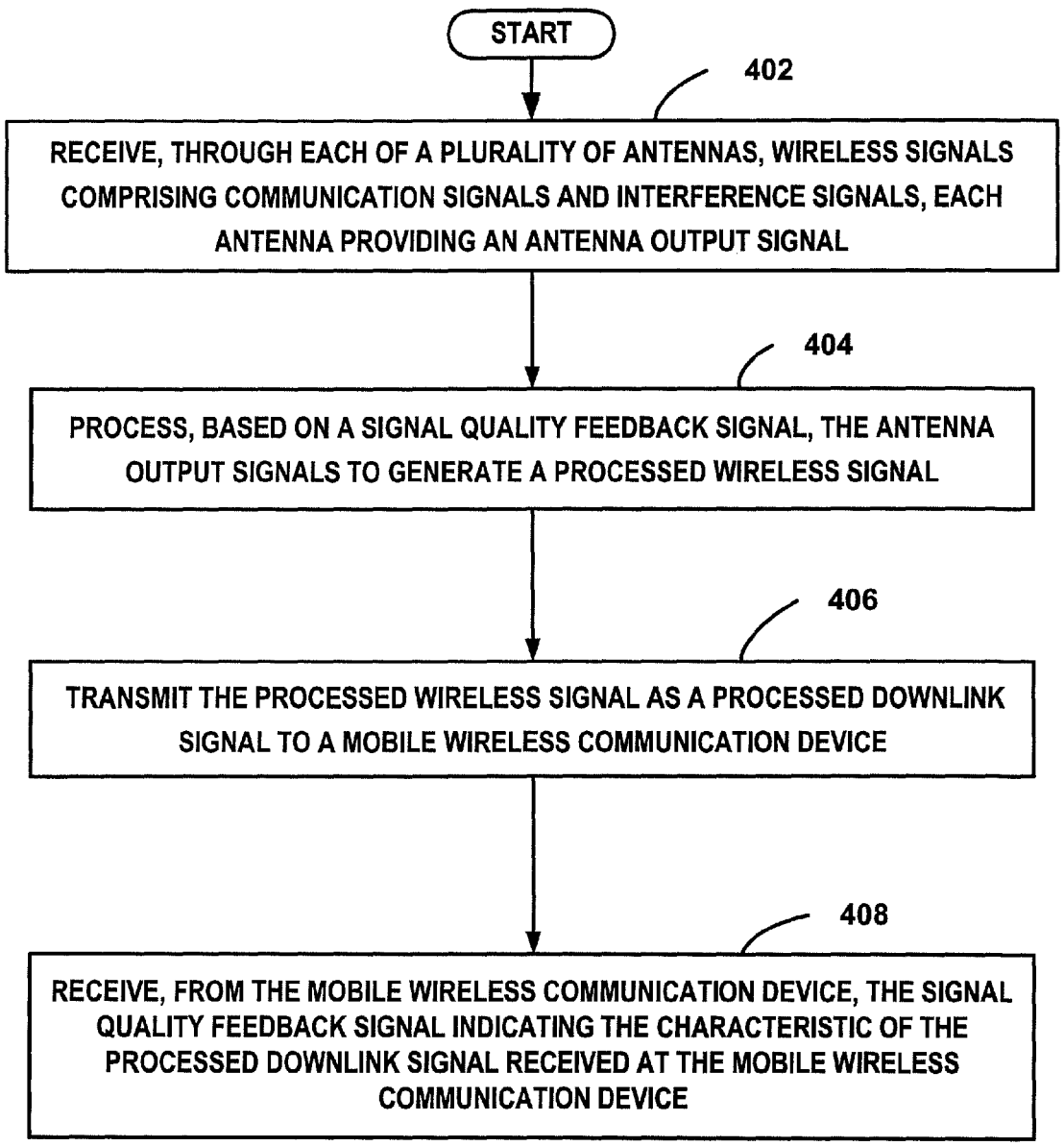
FIG. 4 is flow chart of a method of processing and retransmitting signals.

FIG. 4 is flow chart of a method of processing and retransmitting signals. Although the method may be performed using any hardware and code within different types of systems, the example described with reference to FIG. 4 is performed in a communication system 102 using a repeater apparatus 100.

At step 402, wireless signals are received through a plurality of antennas 116, 118. The wireless signals include communication signals (downlink signals) 112 and undesired interference signals 114, where the interference signals 114 may be downlink signals transmitted from a nearby base station 106 that is providing wireless service to mobile devices other than the mobile wireless communication devices 108, 110 within the cell of the base station 104. Each antenna 116, 118 provides an antenna output signal 120, 122 resulting from the wireless communication signals it receives.

At step 404, antenna output signals 120, 122 are processed to generate a processed wireless signal 131. In the example, a wireless signal processor 124 applies signal quality feedback signals 126, 128 received from mobile wireless communication devices 108, 110 to combine the signals. The antenna output signals 120, 122 are complex weighted (amplitude and phase adjusted) and combined to generate the processed wireless signal 131. The combining is a summation of the weighted signals for the example although other combination techniques may be used in some circumstances. As mentioned above, the antenna output signals 120, 122 are processed without demodulation or down conversion.

At step 406, the processed wireless signal 131 is transmitted as a processed downlink signal 132. An amplifier 224 in a transmitter 220 amplifies the processed wireless signal 131 before transmission through one or more antennas 136.

At step 408, the signal quality feedback signals 126, 128 are received from the mobile wireless communication devices 108, 110. The signal quality feedback signals 126, 128 indicate a quality of the processed downlink signal 132 received at the mobile wireless communication devices 108, 110. The signal quality feedback signals 126, 128 include a signal quality indicator that may be for example, a signal to noise ratio (SNR), signal to interference-plus-noise ratio (SINR), signal-to-interference ratio (SIR), bit error rate (BER), or a combination of two or more of these parameters. The signal quality feedback signals 126, 128 may be a result of a channel estimation performed by the mobile wireless communication devices 108, 110 in accordance with conventional techniques. As discussed above, the signal quality feedback signals 126, 128 are transmitted using a different wireless communication standard than the standard used by the base stations 104, 106. Also, the signal quality feedback signals 126, 128 may be received outside of a communication frequency band 302 used for transmission of the processed downlink signals. For the example, the signal quality feedback signals 126, 128 are transmitted and received in accordance with an IEEE communication specification or standard.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:
   a plurality of antennas configured to receive wireless signals comprising communication signals and interference signals, each antenna providing an antenna output signal;
   a wireless signal processor configured to process the antenna output signals by weighting the antenna output signals to adjust amplitudes of the antenna output signals before summing the weighted antenna output signals to generate a processed wireless signal;
   a user equipment (UE) communication interface configured to transmit the processed wireless signal as a processed downlink signal to a mobile wireless communication device; and
   a signal quality feedback interface configured to receive, from the mobile wireless communication device, a signal quality feedback signal indicating a characteristic of the processed downlink signal received at the mobile wireless communication device, the wireless signal processor configured to process the antenna output signals based on the signal quality feedback signal.

2. The apparatus of claim 1, wherein the wireless signal processor is further configured to process the antenna output signals by weighting the antenna output signals to adjust the phases of the antenna output signals before summing the weighted antenna output signals to generate the processed wireless signal.

3. The apparatus of claim 2, further comprising an amplifier configured to amplify the summed weighted antenna output signals to generate the processed wireless signal.

4. The apparatus of claim 1, wherein the signal quality feedback signal indicates a result of a channel estimation performed by the mobile wireless communication device.

5. The apparatus of claim 4, wherein the signal quality feedback signal comprises a signal quality indicator selected from a signal to noise ratio (SNR), signal to interference-plus-noise ratio (SINR), signal-to-interference ratio (SIR), bit error rate (BER), and combinations thereof.

6. The apparatus of claim 1, wherein the wireless signal processor generates the processed wireless signal without analog to digital conversion processing of the antenna output signals.

7. The apparatus of claim 1, wherein the processed downlink signals are transmitted within a communication frequency band and the signal quality feedback signal is received outside the communication frequency band.

8. The apparatus of claim 1, wherein the processed downlink signals are transmitted in accordance with a first wireless communication standard and the signal quality feedback signal is received in accordance with a second wireless communication standard different than the first wireless communication standard.

9. The apparatus of claim 8, wherein the signal quality feedback signal complies with an Institute of Electrical and Electronics Engineers (IEEE) 802.11 communication specification.

10. A method comprising:
receiving, through each of a plurality of antennas, wireless signals comprising communication signals and interference signals, each antenna providing an antenna output signal;
processing, based on a signal quality feedback signal, the antenna output signals by weighting the antenna output signals to adjust amplitudes of the antenna output signals to generate weighted antenna output signals and summing the weighted antenna output signals to generate a processed wireless signal;
transmitting the processed wireless signal as a processed downlink signal to a mobile wireless communication device; and
receiving, from the mobile wireless communication device, the signal quality feedback signal indicating a characteristic of the processed downlink signal received at the mobile wireless communication device.

11. The method of claim 10, wherein processing further comprises:
weighting the antenna output signals to adjust phases of the antenna output signals to generate weighted antenna output signals.

12. The method of claim 11, further comprising amplifying the summed weighted antenna output signals to generate the processed wireless signal.

13. The method of claim 10, wherein the signal quality feedback signal indicates a result of a channel estimation performed by the mobile wireless communication device.

14. The method of claim 13, wherein the signal quality feedback signal comprises a signal quality indicator selected from a signal to noise ratio (SNR), signal to interference-plus-noise ratio (SINR), signal-to-interference ratio (SIR), bit error rate (BER), and combinations thereof.

15. The method of claim 10, wherein the processing comprises generating the processed wireless signal without analog to digital conversion processing of the antenna output signals.

16. The method of claim 10, wherein transmitting the processed downlink signals comprises transmitting the processed downlink signals within a communication frequency band; and
wherein receiving the signal quality feedback signal comprises receiving the signal quality feedback signal outside of the communication frequency band.

17. The method of claim 10, wherein transmitting the processed downlink signals comprises transmitting the processed downlink signals in accordance with a first wireless communication standard different from a second wireless communication standard used to receive the signal quality feedback signal.

18. The method of claim 17, wherein the signal quality feedback signal complies with an Institute of Electrical and Electronics Engineers (IEEE) 802.11 communication specification.

19. An apparatus comprising:
a plurality of antennas configured to receive wireless signals comprising communication signals and interference signals, each antenna providing an antenna output signal;
a wireless signal processor configured to process the antenna output signals, based on a signal quality feedback signal, to generate a processed wireless signal;
a user equipment (UE) communication interface configured to transmit the processed wireless signal as a processed downlink signal to a mobile wireless communication device; and
a signal quality feedback interface configured to receive, from the mobile wireless communication device, the signal quality feedback signal, the signal quality feedback signal:
indicates a characteristic of the processed downlink signal received at the mobile wireless communication device,
indicates a result of a channel estimation performed by the mobile wireless communication device, and
comprises a signal quality indicator selected from a signal to noise ratio (SNR), a signal to interference-plus-noise ratio (SINR), a signal-to-interference ratio (SIR), a bit error rate (BER), and combinations thereof.

20. The apparatus of claim 19, wherein the processed downlink signals are transmitted within a communication frequency band and the signal quality feedback signal is received outside the communication frequency band.

21. The apparatus of claim 19, wherein the processed downlink signals are transmitted in accordance with a first wireless communication standard and the signal quality feedback signal is received in accordance with a second wireless communication standard different than the first wireless communication standard.

22. The apparatus of claim 21, wherein the signal quality feedback signal complies with an Institute of Electrical and Electronics Engineers (IEEE) 802.11 communication specification.

23. An apparatus comprising:
a plurality of antennas configured to receive wireless signals comprising communication signals and interference signals, each antenna providing an antenna output signal;
a wireless signal processor configured to process the antenna output signals to generate a processed wireless signal;
a user equipment (UE) communication interface configured to transmit the processed wireless signal as a processed downlink signal to a mobile wireless communication device, the processed downlink signal is transmitted within a communication frequency band; and
a signal quality feedback interface configured to receive, from the mobile wireless communication device, a signal quality feedback signal outside the communication frequency band, the signal quality feedback signal indicating a characteristic of the processed downlink signal received at the mobile wireless communication device, the wireless signal processor configured to process the antenna output signals based on the signal quality feedback signal.

24. An apparatus comprising:
a plurality of antennas configured to receive wireless signals comprising communication signals and interference signals, each antenna providing an antenna output signal;
a wireless signal processor configured to process the antenna output signals to generate a processed wireless signal;
a user equipment (UE) communication interface configured to transmit the processed wireless signal as a processed downlink signal to a mobile wireless communication device, the processed downlink signal is transmitted in accordance with a first wireless communication standard; and
a signal quality feedback interface configured to receive, from the mobile wireless communication device, a signal quality feedback signal in accordance with a second wireless communication standard different than the first wireless communication standard, the signal quality feedback signal indicating a characteristic of the processed downlink signal received at the mobile wireless communication device, the wireless signal processor configured to process the antenna output signals based on the signal quality feedback signal.

25. The apparatus of claim 24, wherein the signal quality feedback signal complies with an Institute of Electrical and Electronics Engineers (IEEE) 802.11 communication specification.

26. A method comprising:
receiving, through each of a plurality of antennas, wireless signals comprising communication signals and interference signals, each antenna providing an antenna output signal;
processing, based on a signal quality feedback signal, the antenna output signals to generate a processed wireless signal;
transmitting the processed wireless signal as a processed downlink signal to a mobile wireless communication device; and
receiving, from the mobile wireless communication device, the signal quality feedback signal, the signal quality feedback signal:
indicates a characteristic of the processed downlink signal received at the mobile wireless communication device,
indicates a result of a channel estimation performed by the mobile wireless communication device, and
comprises a signal quality indicator selected from a signal to noise ratio (SNR), a signal to interference-plus-noise ratio (SINR), a signal-to-interference ratio (SIR), a bit error rate (BER), and combinations thereof.

27. A method comprising:
receiving, through each of a plurality of antennas, wireless signals comprising communication signals and interference signals, each antenna providing an antenna output signal;
processing, based on a signal quality feedback signal, the antenna output signals to generate a processed wireless signal;
transmitting the processed wireless signal as a processed downlink signal, within a communication frequency band, to a mobile wireless communication device; and
receiving, from the mobile wireless communication device, the signal quality feedback signal outside of the communication frequency band, the signal quality feedback signal indicating a characteristic of the processed downlink signal received at the mobile wireless communication device.

28. A method comprising:
receiving, through each of a plurality of antennas, wireless signals comprising communication signals and interference signals, each antenna providing an antenna output signal;
processing, based on a signal quality feedback signal, the antenna output signals to generate a processed wireless signal;
transmitting the processed wireless signal as a processed downlink signal, in accordance with a first wireless communication standard, to a mobile wireless communication device; and
receiving, from the mobile wireless communication device, the signal quality feedback signal in accordance with a second wireless communication standard different from the first wireless communication standard, the signal quality feedback signal indicating a characteristic of the processed downlink signal received at the mobile wireless communication device.

29. The method of claim 28, wherein the signal quality feedback signal complies with an Institute of Electrical and Electronics Engineers (IEEE) 802.11 communication specification.

* * * * *